(12) United States Patent
Wang et al.

(10) Patent No.: US 11,816,008 B2
(45) Date of Patent: Nov. 14, 2023

(54) POST CODE REPORTING VIA SECURE DIGITAL MEMORY INTERFACE

(71) Applicant: Intel Corporation, Santa Clara, CA (US)

(72) Inventors: Yanbai Wang, Shanghai (CN); Lingjing Zeng, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 17/056,398

(22) PCT Filed: Dec. 24, 2018

(86) PCT No.: PCT/CN2018/123146
§ 371 (c)(1),
(2) Date: Nov. 17, 2020

(87) PCT Pub. No.: WO2020/132821
PCT Pub. Date: Jul. 2, 2020

(65) Prior Publication Data
US 2021/0263816 A1 Aug. 26, 2021

(51) Int. Cl.
*G06F 11/00* (2006.01)
*G06F 11/22* (2006.01)
(Continued)

(52) U.S. Cl.
CPC ...... *G06F 11/2284* (2013.01); *G06F 13/1668* (2013.01); *G06F 13/4282* (2013.01)

(58) Field of Classification Search
CPC .. G06F 11/2284; G06F 11/008; G06F 11/263; G06F 11/273; G06F 11/167; G06F 11/22; G06F 11/1417
See application file for complete search history.

(56) References Cited

U.S. PATENT DOCUMENTS

| 10,803,970 B2 * | 10/2020 | Schuh | G11C 29/08 |
| 2007/0124798 A1 * | 5/2007 | Dennis | H04L 9/3226 726/2 |

(Continued)

FOREIGN PATENT DOCUMENTS

| CN | 101739322 A | 6/2010 |
| CN | 202143175 U | 2/2012 |
| CN | 102662696 A | 9/2012 |

OTHER PUBLICATIONS

International Search Report and Written Opinion dated Sep. 30, 2019 for International Application No. PCT/CN2018/123146, 9 pages.

*Primary Examiner* — Charles Ehne
(74) *Attorney, Agent, or Firm* — Schwabe, Williamson & Wyatt, P.C.

(57) ABSTRACT

Device and method for reporting power-on self-test (POST) codes of a computing device via a standard external memory card interface. A BIOS of the personal computing device is programmed to configure, during a power-on sequence, multiple signal connections of the standard external memory card interface for conveyance of general purpose input and output signals. When a complementary memory signal conversion device is detected in the memory card interface during the power-on sequence, the BIOS may initiate transmission of a serial data signal containing POST codes related to any detected startup errors.

15 Claims, 6 Drawing Sheets

(51) Int. Cl.
*G06F 13/16* (2006.01)
*G06F 13/42* (2006.01)

(56) References Cited

U.S. PATENT DOCUMENTS

2016/0371163 A1* 12/2016 Swierk ................ G06F 11/2284
2018/0075242 A1 3/2018 Khatri et al.
2019/0162782 A1* 5/2019 Shanbhogue .... G01R 31/31721

* cited by examiner

US 11,816,008 B2

POST CODE REPORTING VIA SECURE DIGITAL MEMORY INTERFACE

CROSS REFERENCE TO RELATED APPLICATIONS

The present application is a national phase entry under 35 U.S.C. § 371 of International Application No. PCT/CN2018/123146, filed Dec. 24, 2018, entitled "POST CODE REPORTING VIA SECURE DIGITAL MEMORY INTERFACE", which designated, among the various States, the United States of America. The Specifications of the PCT/CN2018/123146 Application is hereby incorporated by reference.

BACKGROUND

The present disclosure relates to reporting power-on self-test (POST) codes of a computing device, and in particular, to enable such reporting during final production testing using a standard external memory card interface.

A power-on self-test (POST), performed by virtually all computing systems and devices, is a process by which firmware or software routines are performed immediately after a computer or other digital electronic device is powered on. In the event of errors or faults within the system or device, results of the POST may be used to diagnose and pursue solutions. However, the results must somehow be retrieved in some readable form (e.g., by a human user or machine). Conventional techniques for this have been inclusion of a display (e.g., a multi-character seven segment LED display panel) that is part of the system or device, output test results data or codes to an external device, or stored in memory for future retrieval by a diagnostic tool. However, a display not only adds costs but also physical requirements (e.g., additional electrical connections and mounting space), while sending data to an external device or storing in memory for future retrieval typically involve uses of higher-level interfaces that may not even be operative in the event of more serious failures. The POST may also detect a non-functional human-readable display and instead initiate emissions of either light flashes or audio tones. However, these are limited in terms of how many types of errors or faults can be effectively identified to a user.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
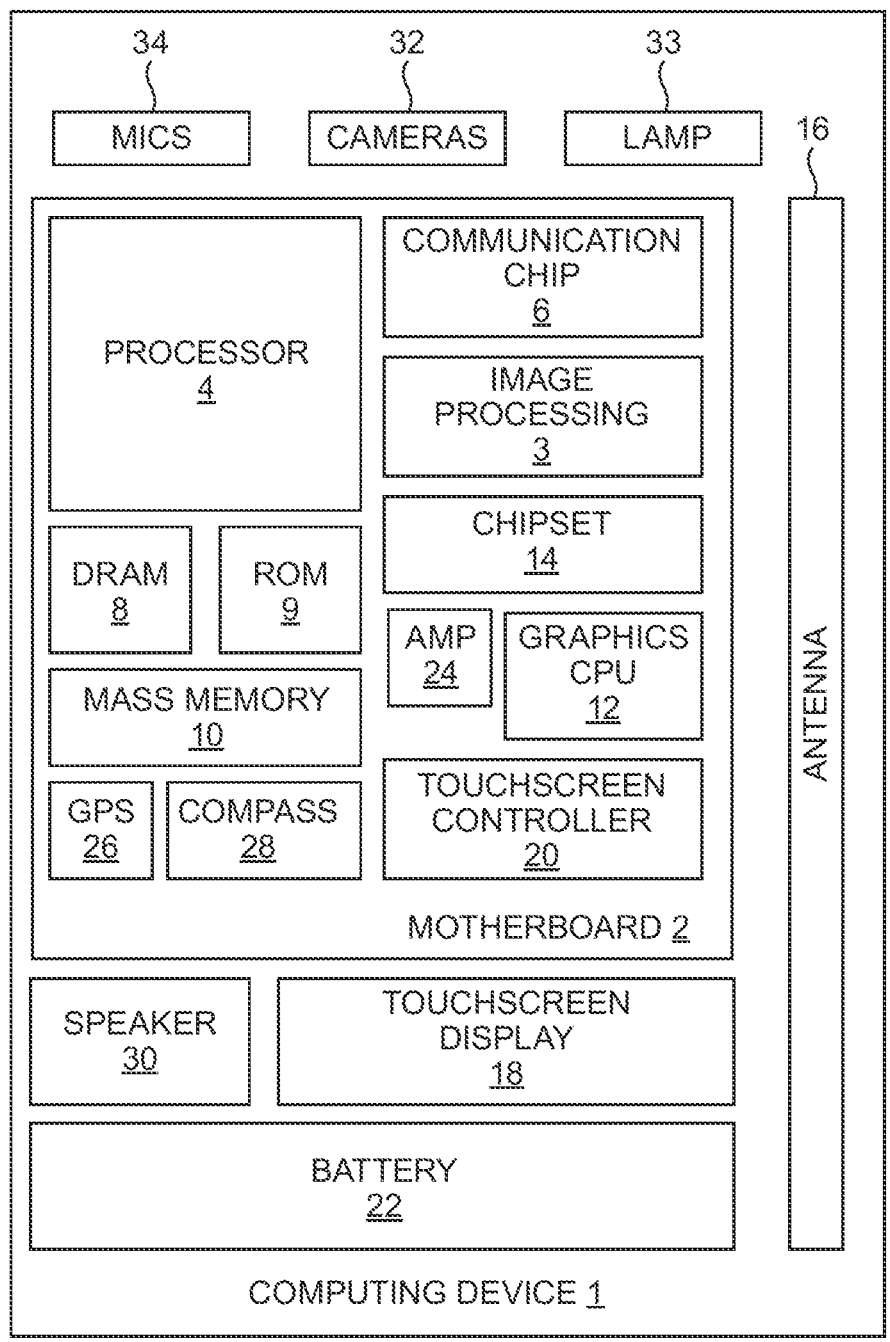
FIG. 1 illustrates a block diagram of a computing device 1 according to example embodiments.

FIG. 1 illustrates a block diagram of a computing device 1 according to example embodiments. The computing device 1 may house a system board 2 that may include a number of components, including, without limitation, to a processor 4 and at least one communication package 6. The communication package 6 may be coupled to one or more antennas 16. The processor 4 may be physically as well as electrically coupled to the board 2.

Depending on its applications, computing device 1 may include other components that may or may not be physically and electrically coupled to the board 2. These other components include, without limitation, volatile memory (e.g., DRAM) 8, non-volatile memory (e.g., ROM or BIOS) 9, flash memory (not shown), a graphics processor 12, a digital signal processor (not shown), a crypto processor (not shown), a chipset 14, an antenna 16, a display 18 (e.g., a touchscreen), a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a lamp 33, a microphone array 34, and a mass memory device (e.g., a hard disk drive) 10, compact disk (CD) drive (not shown), digital versatile disk (DVD) drive (not shown), and so forth. These components may be connected to the system board 2, mounted to the system board, or combined with any of the other components.

As is well known in the art, BIOS (sometimes also referred to as the System BIOS, ROM BIOS or PC BIOS) is typically non-volatile firmware used to perform hardware initialization during a system boot process (e.g., power-on startup), and to provide runtime services for operating systems and programs. The BIOS firmware is generally pre-installed on a system board and is the first software to run when the system is initially powered on. The BIOS in a modern PC initializes and tests the system hardware components and loads a boot loader from the mass memory device 10 which then initializes the operating system (OS). Most BIOS implementations are designed to work with a particular system or motherboard by interfacing with various devices that make up the complementary system chipset 14. Previously, BIOS contents were generally stored in a ROM chip on the motherboard. More recently, the BIOS contents may be stored in flash memory to enable updating or otherwise allow it to be rewritten without removing the chip from the motherboard.

The communication package 6 enables wireless and/or wired communications for the transfer of data to and from the computing device 1. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 1 may include multiple communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 may contain image sensors with pixels or photodetectors, and may use resources of an image processing chip 3 to read values and also to perform exposure control, depth map determination, format conversion, coding and decoding, noise reduction and 3D mapping, etc. The processor 4 is coupled to the image processing chip to drive the processes, set parameters, etc.

In various implementations, the computing device 1 may be eyewear, a laptop, a netbook, a notebook, an ultra book, a smartphone, a tablet, a personal digital assistant (PDA), an ultra mobile PC, a mobile phone, a desktop computer, a server, a set-top box, an entertainment control unit, a digital camera, a portable music player, a digital video recorder, wearables or drones. The computing device may be fixed, portable, or wearable. In further implementations, the computing device 1 may be any other electronic device that processes data. Embodiments may be further implemented as a part of one or more memory chips, controllers, CPUs (Central Processing Unit), microchips or integrated circuits interconnected using a motherboard, an application specific integrated circuit (ASIC), and/or a field programmable gate array (FPGA).

Hence, results of the POST may potentially include many possible forms of errors or faults to be communicated for resolution. For example, examples of commonly known Port 80h (hexadecimal) POST codes may include: 00-0F Debug; 10-1F Host Processors; 20-2F Memory/Chipset; 30-3F Recovery; 40-4F (reserved); 50-5F I/O Busses (e.g., PCI, USB, ISA, ATA, etc.); 60-6F (not currently used); 70-7F Output Devices; 80-8F (reserved); 90-9F Input Devices (e.g., keyboard or mouse); A0-AF (reserved); B0-BF Boot Devices (e.g., fixed and removable storage media); C0-CF (reserved); D0-DF Boot device selection; E0-EE miscellaneous; and F0-FF: FF processor exceptions. Accordingly, it would be advantageous to enable reporting of such a multitude of possible errors or faults using pre-existing hardware and/or software already available within a typical computing system or device. In the case of hardware, multiple types of signal interfaces are already available and, in the case of software, the system BIOS is already used during POST.

For example, personal computing devices, particularly mobile devices such as laptop and tablet style computers, generally include external interfaces for various memory cards, such as a Secure Digital (SD) card. The SD interface includes five card families (Standard-Capacity (SDSC), High-Capacity (SDHC), eXtended-Capacity (SDXC), Ultra-Capacity (SDUC) and SDIO) available in three different sizes (original, mini and micro). Electrically passive adapters allow smaller cards to fit and function in devices built for larger cards, and their small footprints make them an ideal storage medium for smaller, thinner and more portable electronic devices. The SDIO combines input/output functions with data storage and requires the host device be designed for the input/output functions the card provides. This is typically done by including any necessary additional code within the BIOS of the host device.

A SDIO (Secure Digital Input Output) card is an extension of the SD specification to cover I/O functions, and typically requires its host devices to be designed to support its input-output functions. Such host devices may thus be enabled to use the SD slot to support GPS receivers, modems, barcode readers, FM radio tuners, TV tuners, RFID readers, digital cameras, and interfaces to Wi-Fi, Bluetooth, Ethernet and/or IrDA.

A SDIO card supports most memory commands of SD cards, and may be structured as eight logical cards, although typically this capability is structured as one I/O card and one memory card. The SDIO and SD interfaces are generally mechanically and electrically similar. Host devices built for SDIO cards generally also accept SD memory cards without I/O functions, though the reverse is generally not true since host devices need suitable drivers and applications to support the I/O functions. Hence, while inserting an SDIO card into any SD slot causes no physical damage or disruption to the host device, the SDIO card may not function fully when inserted into a seemingly compatible slot.

The SDIO family includes Low-Speed and Full-Speed cards, both of which support SPI and single-bit SD bus types. Low-Speed SDIO cards may also support the four-bit SD bus, while Full-Speed SDIO cards are required to support the four-bit SD bus. Use of a SDIO card as a "combination" card (i.e., for both memory and I/O) requires that the host device first select four-bit SD bus operation. Other unique features of Low-Speed SDIO are a maximum clock rate of 400 kHz for all communications, and the use of Pin 8 as "interrupt" for initiating dialogue with a host device.

Figure 2A:
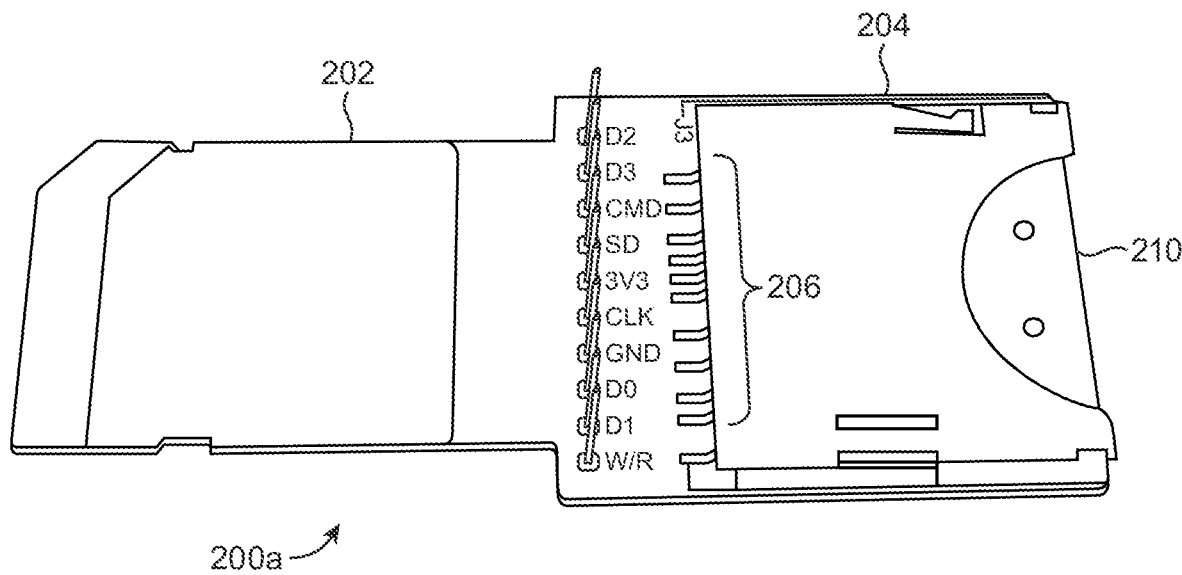
FIGS. 2A-2B illustrate top and bottom views of a SD converter for receiving SD signal data according to example embodiments.
Figure 2B:
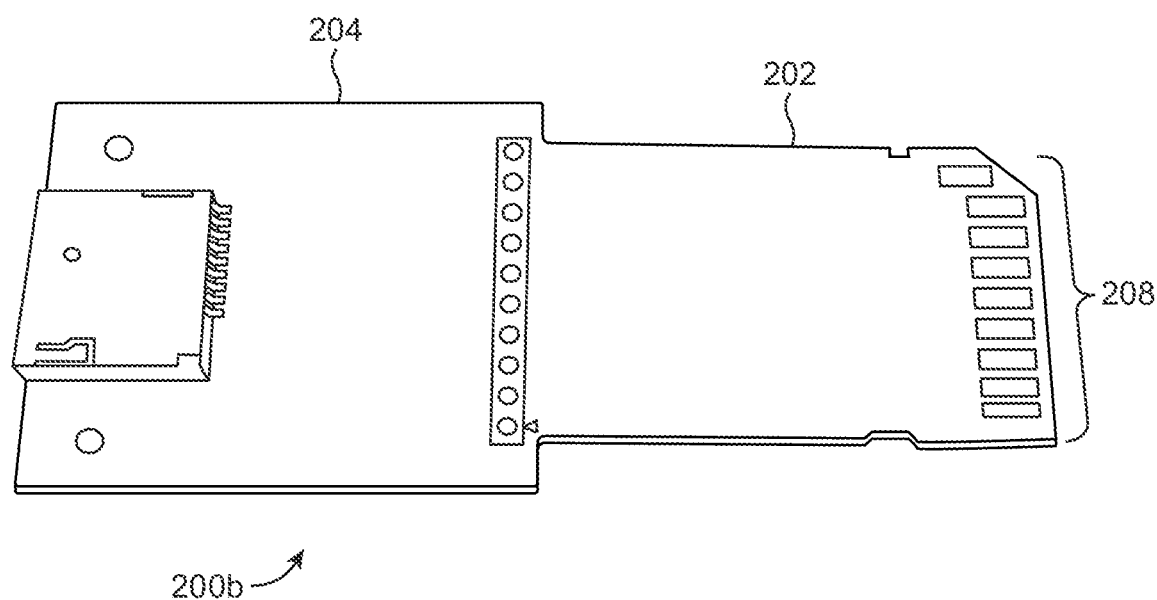

FIGS. 2A-2B illustrate top and bottom views of a SD converter 200 for receiving SD signal data according to example embodiments. A top view 200*a* illustrates a SD adapter body 202 that may contain logic circuitry (discussed in more detail below) for identifying itself as such a converter to the BIOS program (discussed in more detail below) and provide driver circuitry as desired for a display, e.g., in the form of an array of visual indicators 206 identifying the states of the various signal lines. Such display may be housed in a receptacle 210 for a standard SD card into which the logic circuitry may write the POST codes for later retrieval and analysis.

Figure 3:
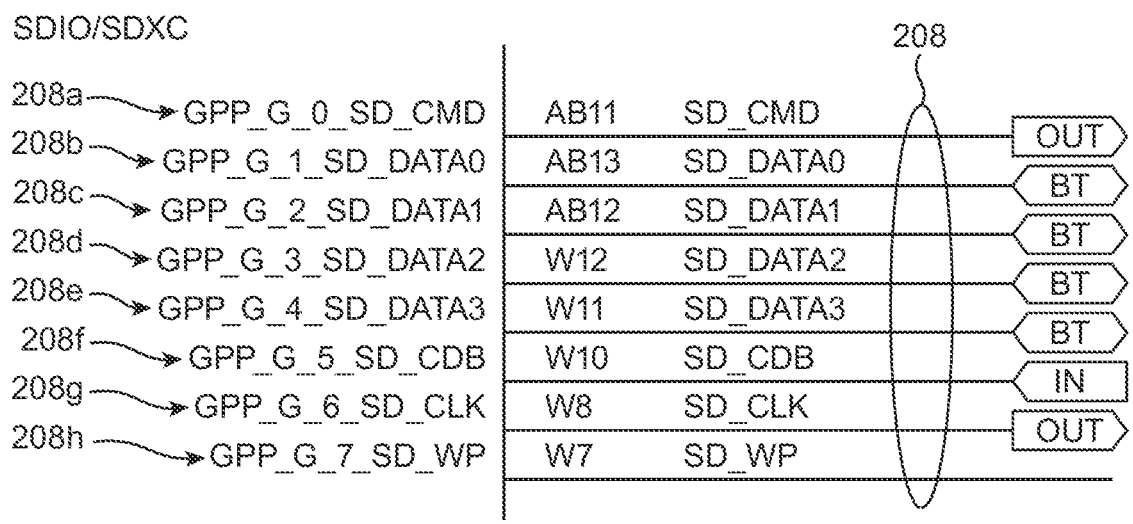
FIG. 3 identifies SD data and control signal lines according to a known SDIO interface family.

FIG. 3 identifies SD signal lines 208 according to a known SDIO interface family, including data signal lines 208*b*-208208*e* and control signal lines 208*a*, 208*f*-208*h*. These SD signals are multi-function (e.g., configurable to operate in native or GPIO mode). In accordance with example embodiments, following a system power-on event, one line may be configured to operate in a general purpose output (GPO) mode while another line may be configured to operate in a general purpose input (GPI) mode. Within the convertor 200 the corresponding signal connections are combined. For example, as discussed in more detail below, a data signal line (e.g., SD_DATA0 208*b*) and a control signal line (e.g., SD_WP 208*h*) may be coupled by the circuitry within the converter 200 to be directly connected or logically connected.

Prior to actual reporting of the POST codes, the data signal line SD_DATA0 may be driven to a logic low state while reading the logic state of the control signal line SD_WP, following which the data signal line SD_DATA0 may be driven to a logic high state while again reading the logic state of the control signal line SD_WP. If the logic state of the control signal line SD_WP follows the logic state of the data signal line SD_DATA0, then it is known that the SD interface contains the converter 200 as opposed to a standard SD card, and the BIOS configures the interface to operate in a GPIO mode, such as a Port 80h mode. Otherwise, if the logic state of the control signal line SD_WP does not follow the logic state of the data signal line SD_DATA0, then the BIOS configures the interface to operate in a standard SD port mode.

Figure 4A:
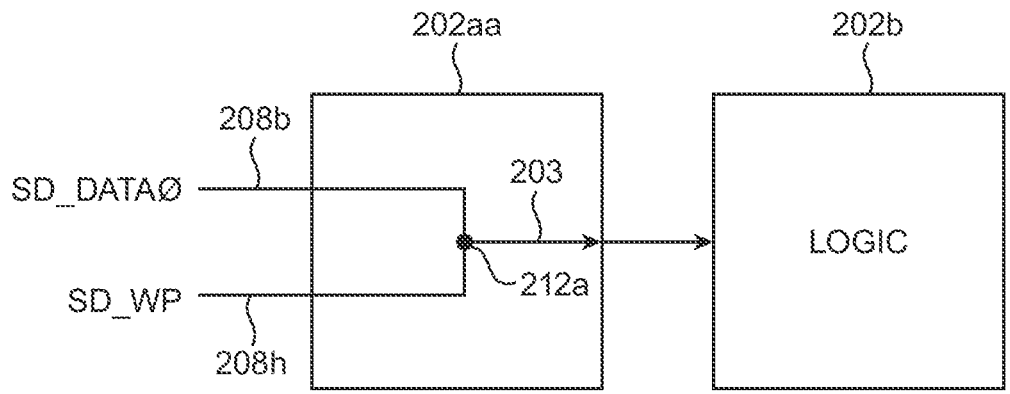
FIGS. 4A-4B illustrate portions of converter circuitry in the converter of FIGS. 2A-2B according to example embodiments.
Figure 4B:
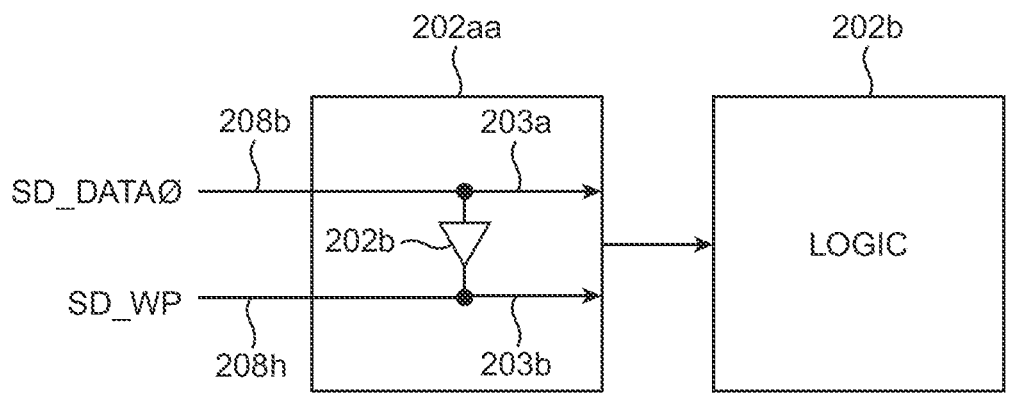

FIGS. 4A-4B illustrate portions of converter circuitry in the converter of FIGS. 2A-2B according to example embodiments. As discussed above, for example embodiments, a data signal line SD_DATA0 208*b* and a control signal line SD_WP 208*h* are combined in circuitry 202*a* in such manner as to cause logic states of the control signal line SD_WP to follow the logic states of the data signal line SD_DATA0. One way may be to use circuitry 202*aa* that forms a direct connection 212*a* (FIG. 4A), while another may be to use circuitry 202*ab* with a non-inverting buffer circuit 212*b* (FIG. 4B) between the signal lines 208*b*, 208*h*, either of which will ensure that the written and read logic states are the same. (Alternatively, an inverting buffer circuit may also be used, provided that the BIOS program is aware to look for a logic inversion between the written and read logic states.) The resulting code signal 203 (FIG. 4A), 203*a*, 203*b* (FIG. 4B) may then be provided to logic circuitry 202*b* for reporting POST codes via any desired display technique, such as a multi-character seven segment LED display identifying the POST codes in hexadecimal form, or for storage in a SD card present within the converter receptacle 210 (FIG. 2A) for later retrieval and analysis.

Figure 5:
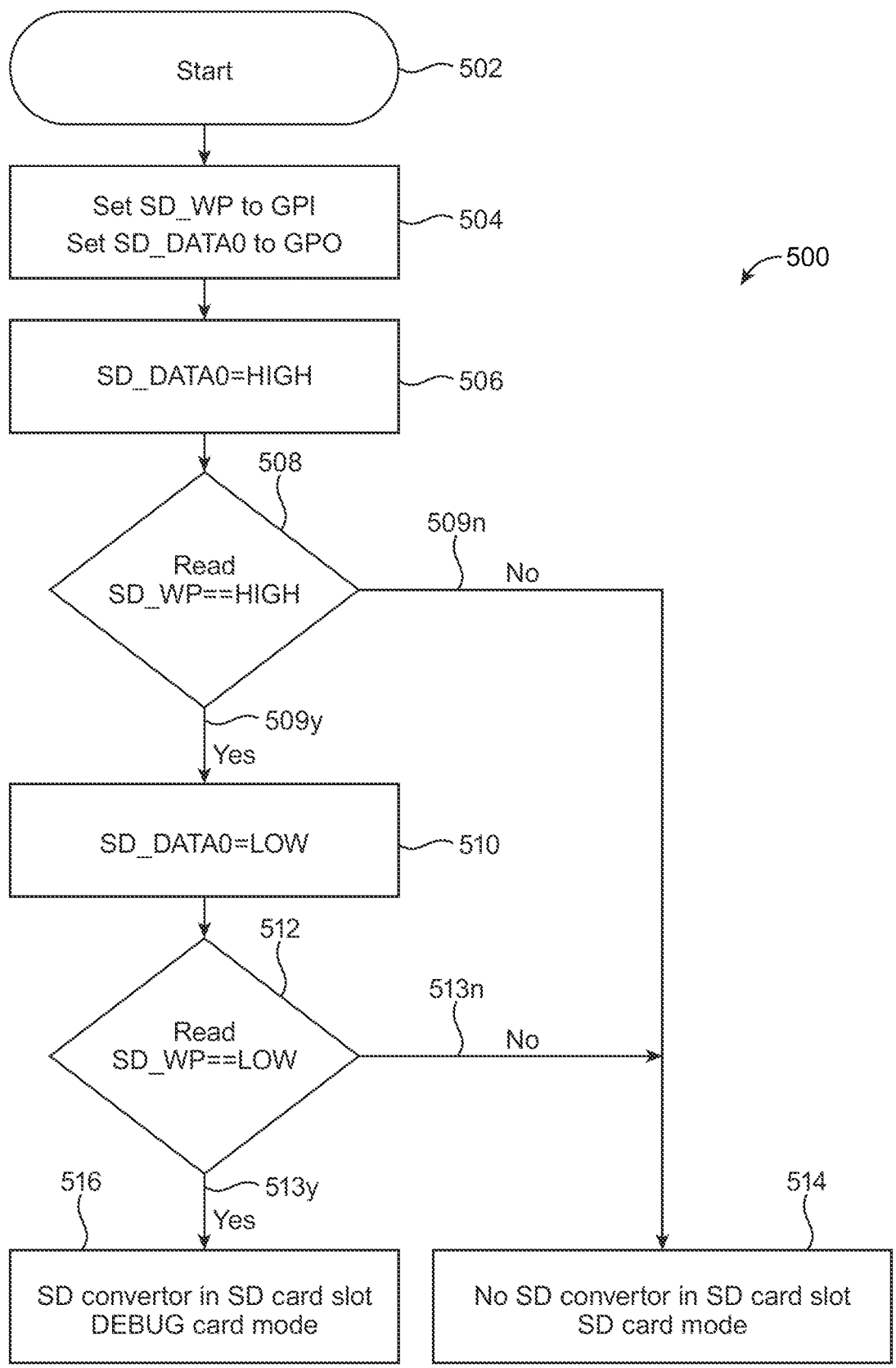
FIG. 5 illustrates operation flow for enabling reporting POST codes of a computing device via a standard external memory card interface according to example embodiments.

FIG. 5 illustrates operation flow 500 for enabling reporting POST codes of a computing device via a standard external memory card interface according to example embodiments. As discussed herein, the BIOS may be programmed to enable this operation flow for reporting POST codes via any desired display technique, such as a multi-character seven segment LED display identifying the POST codes in hexadecimal form. As discussed above, following a power-on event, program operation begins 502 by configuring one line (e.g., a data signal line SD_DATA0 208*b*) to operate in a GPO mode while another line (e.g., a control signal line SD_WP 208*h*) may be configured to operate in a GPI mode 504.

Next, the data signal line SD_DATA0 is driven to a logic high state 506, following which a reading is performed of the logic state of the control signal line SD_WP 508. If the logic state of the control signal line SD_WP follows the logic state of the data signal line SD_DATA0 509*y*, the data signal line SD_DATA0 is driven to a logic low state 510. Next, the data signal line SD_DATA0 is driven to a logic low state 510, following which a reading is performed of the logic state of the control signal line SD_WP 512. If the logic state of the control signal line SD_WP follows the logic state of the data signal line SD_DATA0 513*y*, then it is known that a converter 200 is present and the POST codes may be reported.

However, if the logic state of the control signal line SD_WP does not follow the logic state of the data signal line SD_DATA0 509*n*, 513*n*, then it is known that no converter 200 is present and normal SD card interface operation is to enabled with no reporting of POST codes.

Figure 6:
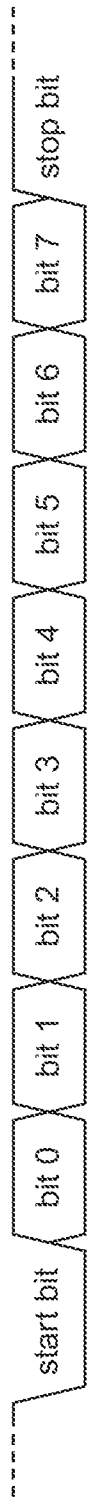
FIG. 6 illustrates the general universal asynchronous receiver-transmitter (UART) signal waveform format.

FIG. 6 illustrates the general UART signal waveform format. As is well known, this is a serial data signal. The idle, or no data, state is a logic high, or powered, state (a historic legacy from telegraphy in which the line was held high to confirm that the line and transmitter are not functioning). Each character is framed as a logic low start bit, data bits, possibly a parity bit, and one or more stop bits. In most applications the least significant data bit (the left-most bit in this diagram) is transmitted first. The start bit signals to the receiver that a new character is coming. The next five to nine bits (depending on the code set employed) represent the character. If a parity bit is used, it will follow after all data bits, after which the next one or two bits are in a "mark" condition (i.e., a logic high, '1', state) and called the stop bit(s). They signal to the receiver that the character is complete. Hence, since the start bit is logic low (0) and the stop bit is logic high (1) there are always at least two guaranteed signal changes between characters. Holding the connection in the logic low condition for longer than a character time interval is interpreted as a "break" condition that may be detected by the UART.

An example of coding to use the GPIO simulation capabilities of the UART (e.g., with a 9600 baud rate) may be as follows:

```
void
DelayOne( )
{
UINT64 Start;
volatile UINT64 *p;
p=(UINT64*)MAIN_CNTR;
Start=*p;
while ((*p)-Start<(OneSecond/BAUDRATE)-REVISE-
    FOR9600) { }
}
void
SendData(UINT8 Value)
{
UINT8 Index; UINT32 *GPIO;
GPIO=(UINT32*) SD_CMD;
//Idle Status Uart is high
DriveGPIOHIGH;
//Start bit
DriveGPIOLOW;
DelayOne( );
//Data
for (Index=0;Index<8;Index++){
if ((Value & 1) !=0){
//Print(L"1");
DriveGPIOHIGH;
}
else {
//Print(L"0");
DriveGPIOLOW:
}
Value=Value>>1;
DelayOne( );
```

}
//No Parity bit
//Stop bit
DriveGPIOHIGH;
//Idle Status Uart is high
DelayOne( );
}

Figure 7:
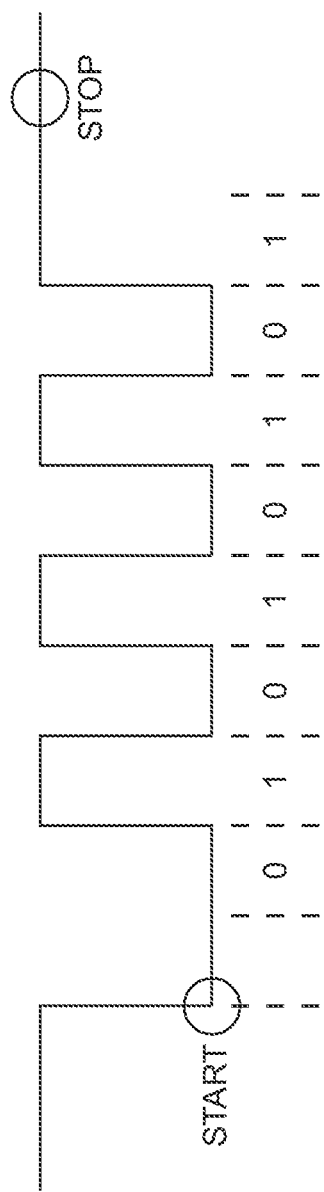
FIG. 7 illustrates a UART signal example composed of alternating logic zero and logic one signal states.

FIG. 7 illustrates a UART signal composed of alternating logic low and logic high signal states. As per the standard format, a UART signal is known to have started following a transition from a logic high state to a logic low state plus a duration of one full bit interval. The signal bits follow with each occupying one full bit interval each of which begins with either no transition or a transition from a logic high state to a logic low state, interpreted as a logic zero, or a transition from a logic low state to a logic high state, interpreted as a logic one.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing and following description and the following claims, the term "coupled" along with its derivatives, may be used. "Coupled" is used to indicate that two or more elements cooperate or interact with each other, but they may or may not have intervening physical or electrical components between them.

As used in the claims, unless otherwise specified, the use of the ordinal adjectives "first", "second", "third", etc., to describe a similar element, merely indicate that different instances of such elements are being recited, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of operation described herein may be changed and are not limited to the manner described herein. Moreover, actions of any operation flow need not be implemented in the order described, nor do all actions necessarily need to be performed. Also, those actions that are not dependent on other actions may be performed in parallel with the other actions.

Method examples described herein may be implemented, at least in part, with nor or more machines or computing devices. Some examples may include a computer-readable medium or machine-readable medium encoded with instructions operable to configure an electronic device to perform methods as described in the examples disclosed herein. An example implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, without limitation, hard disks, removable magnetic disks, removable optical disks (e.g., compact disks and digital video disks), magnetic cassettes, memory cards or sticks, random access memory (RAM), read only memory (ROM), and the like.

The following examples pertain to further embodiments. The various features of the different embodiments may be variously combined with some features included and others excluded to suit a variety of different applications.

Some embodiments pertain to at least one non-transitory machine readable medium including instructions that, when executed by a first device, cause the first device to perform operations for reporting power-on self-test (POST) codes of a personal computing device via a secure digital (SD) interface, comprising: following reception of system power, assigning a first signal connection and a second signal connection of a plurality of signal connections of the SD interface for conveyance of a general purpose input signal and conveyance of a general purpose output signal; writing, to the first signal connection, a first write signal having a first write logic state; reading, from the second signal connection, a first read signal having a first read logic state; writing, to the first signal connection, a second write signal having a second write logic state; reading, from the second signal connection, a second read signal having a second read logic state; and responsive to a reading of the first read signal having the first read logic state equal to the first write logic state, followed by a reading of the second read signal having the second read logic state equal to the second write logic state, initiating a serial data signal to at least one of the first and second signal connections.

In further embodiments, the first signal connection comprises a data signal connection of the plurality of signal connections of the SD interface; and the second signal connection comprises a control signal connection of the plurality of signal connections of the SD interface.

In further embodiments, the initiating transmission of a serial data signal to at least one of the first and second signal connections comprises initiating transmission of a universal asynchronous receiver-transmitter (UART) data signal.

In further embodiments, the initiating transmission of a serial data signal to at least one of the first and second signal connections comprises configuring the first and second signal connections to convey a data signal in a 80h port mode.

In further embodiments, the first and second write logic states comprise low and high logic states.

Some embodiments pertain to circuitry for reporting power-on self-test (POST) codes of a personal computing device via a secure digital (SD) interface, comprising: means for, following reception of system power, assigning a first signal connection and a second signal connection of a plurality of signal connections of the SD interface for conveyance of a general purpose input signal and conveyance of a general purpose output signal; means for writing, to the first signal connection, a first write signal having a first write logic state; means for reading, from the second signal connection, a first read signal having a first read logic state; means for writing, to the first signal connection, a second write signal having a second write logic state; means for reading, from the second signal connection, a second read signal having a second read logic state; and means for, responsive to a reading of the first read signal having the first read logic state equal to the first write logic state, followed by a reading of the second read signal having the second read logic state equal to the second write logic state, initiating a serial data signal to at least one of the first and second signal connections.

In further embodiments, the first signal connection comprises a data signal connection of the plurality of signal connections of the SD interface; and the second signal connection comprises a control signal connection of the plurality of signal connections of the SD interface.

In further embodiments, wherein the initiating transmission of a serial data signal to at least one of the first and second signal connections comprises initiating transmission of a universal asynchronous receiver-transmitter (UART) data signal.

In further embodiments, wherein the initiating transmission of a serial data signal to at least one of the first and second signal connections comprises configuring the first and second signal connections to convey a data signal in a 80h port mode.

In further embodiments, wherein the first and second write logic states comprise low and high logic states.

Some embodiments pertain to a method of reporting power-on self-test (POST) codes of a personal computing device via a secure digital (SD) interface, comprising: following reception of system power, assigning a first signal connection and a second signal connection of a plurality of signal connections of the SD interface for conveyance of a general purpose input signal and conveyance of a general purpose output signal; writing, to the first signal connection, a first write signal having a first write logic state; reading, from the second signal connection, a first read signal having a first read logic state; writing, to the first signal connection, a second write signal having a second write logic state; reading, from the second signal connection, a second read signal having a second read logic state; and responsive to a reading of the first read signal having the first read logic state equal to the first write logic state, followed by a reading of the second read signal having the second read logic state equal to the second write logic state, initiating a serial data signal to at least one of the first and second signal connections.

In further embodiments, the first signal connection comprises a data signal connection of the plurality of signal connections of the SD interface; and the second signal connection comprises a control signal connection of the plurality of signal connections of the SD interface.

In further embodiments, wherein the initiating transmission of a serial data signal to at least one of the first and second signal connections comprises initiating transmission of a universal asynchronous receiver-transmitter (UART) data signal.

In further embodiments, wherein the initiating transmission of a serial data signal to at least one of the first and second signal connections comprises configuring the first and second signal connections to convey a data signal in a 80h port mode.

In further embodiments, wherein the first and second write logic states comprise low and high logic states.

The above description illustrates various embodiments of the present disclosure along with examples of how aspects of the particular embodiments may be implemented. The above examples should not be deemed to be the only embodiments and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. At least one non-transitory machine readable medium including instructions that, when executed by a first device, cause the first device to perform operations for reporting power-on self-test (POST) codes of a personal computing device via a secure digital (SD) interface, comprising:
   following reception of system power, assigning a first signal connection and a second signal connection of a plurality of signal connections of said SD interface for conveyance of a general purpose input signal and conveyance of a general purpose output signal;
   writing, to said first signal connection, a first write signal having a first write logic state;
   reading, from said second signal connection, a first read signal having a first read logic state;
   writing, to said first signal connection, a second write signal having a second write logic state;
   reading, from said second signal connection, a second read signal having a second read logic state; and
   responsive to a reading of said first read signal having said first read logic state equal to said first write logic state, followed by a reading of said second read signal having said second read logic state equal to said second write logic state, initiating a serial data signal to at least one of said first and second signal connections.

2. The machine readable medium of claim 1, wherein:
   said first signal connection comprises a data signal connection of said plurality of signal connections of said SD interface; and
   said second signal connection comprises a control signal connection of said plurality of signal connections of said SD interface.

3. The machine readable medium of claim 1, wherein said initiating transmission of a serial data signal to at least one of said first and second signal connections comprises initiating transmission of a universal asynchronous receiver-transmitter (UART) data signal.

4. The machine readable medium of claim 1, wherein said initiating transmission of a serial data signal to at least one of said first and second signal connections comprises configuring said first and second signal connections to convey a data signal in a 80 h port mode.

5. The machine readable medium of claim 1, wherein said first and second write logic states comprise low and high logic states.

6. Circuitry for reporting power-on self-test (POST) codes of a personal computing device via a secure digital (SD) interface, comprising:
   means for, following reception of system power, assigning a first signal connection and a second signal connection of a plurality of signal connections of said SD interface for conveyance of a general purpose input signal and conveyance of a general purpose output signal;
   means for writing, to said first signal connection, a first write signal having a first write logic state;
   means for reading, from said second signal connection, a first read signal having a first read logic state;
   means for writing, to said first signal connection, a second write signal having a second write logic state;
   means for reading, from said second signal connection, a second read signal having a second read logic state; and
   means for, responsive to a reading of said first read signal having said first read logic state equal to said first write logic state, followed by a reading of said second read signal having said second read logic state equal to said second write logic state, initiating a serial data signal to at least one of said first and second signal connections.

7. The circuitry of claim 6, wherein:
said first signal connection comprises a data signal connection of said plurality of signal connections of said SD interface; and
said second signal connection comprises a control signal connection of said plurality of signal connections of said SD interface.

8. The circuitry of claim 6, wherein said initiating transmission of a serial data signal to at least one of said first and second signal connections comprises initiating transmission of a universal asynchronous receiver-transmitter (UART) data signal.

9. The circuitry of claim 6, wherein said initiating transmission of a serial data signal to at least one of said first and second signal connections comprises configuring said first and second signal connections to convey a data signal in a 80h port mode.

10. The circuitry of claim 6, wherein said first and second write logic states comprise low and high logic states.

11. A method of reporting power-on self-test (POST) codes of a personal computing device via a secure digital (SD) interface, comprising:
following reception of system power, assigning a first signal connection and a second signal connection of a plurality of signal connections of said SD interface for conveyance of a general purpose input signal and conveyance of a general purpose output signal;
writing, to said first signal connection, a first write signal having a first write logic state;
reading, from said second signal connection, a first read signal having a first read logic state;
writing, to said first signal connection, a second write signal having a second write logic state;
reading, from said second signal connection, a second read signal having a second read logic state; and
responsive to a reading of said first read signal having said first read logic state equal to said first write logic state, followed by a reading of said second read signal having said second read logic state equal to said second write logic state, initiating a serial data signal to at least one of said first and second signal connections.

12. The method of claim 11, wherein:
said first signal connection comprises a data signal connection of said plurality of signal connections of said SD interface; and
said second signal connection comprises a control signal connection of said plurality of signal connections of said SD interface.

13. The method of claim 11, wherein said initiating transmission of a serial data signal to at least one of said first and second signal connections comprises initiating transmission of a universal asynchronous receiver-transmitter (UART) data signal.

14. The method of claim 11, wherein said initiating transmission of a serial data signal to at least one of said first and second signal connections comprises configuring said first and second signal connections to convey a data signal in a 80h port mode.

15. The method of claim 11, wherein said first and second write logic states comprise low and high logic states.

* * * * *